J. H. HUEHN.
WAGON BRAKE.
APPLICATION FILED NOV. 21, 1908.
917,945.
Patented Apr. 13, 1909.
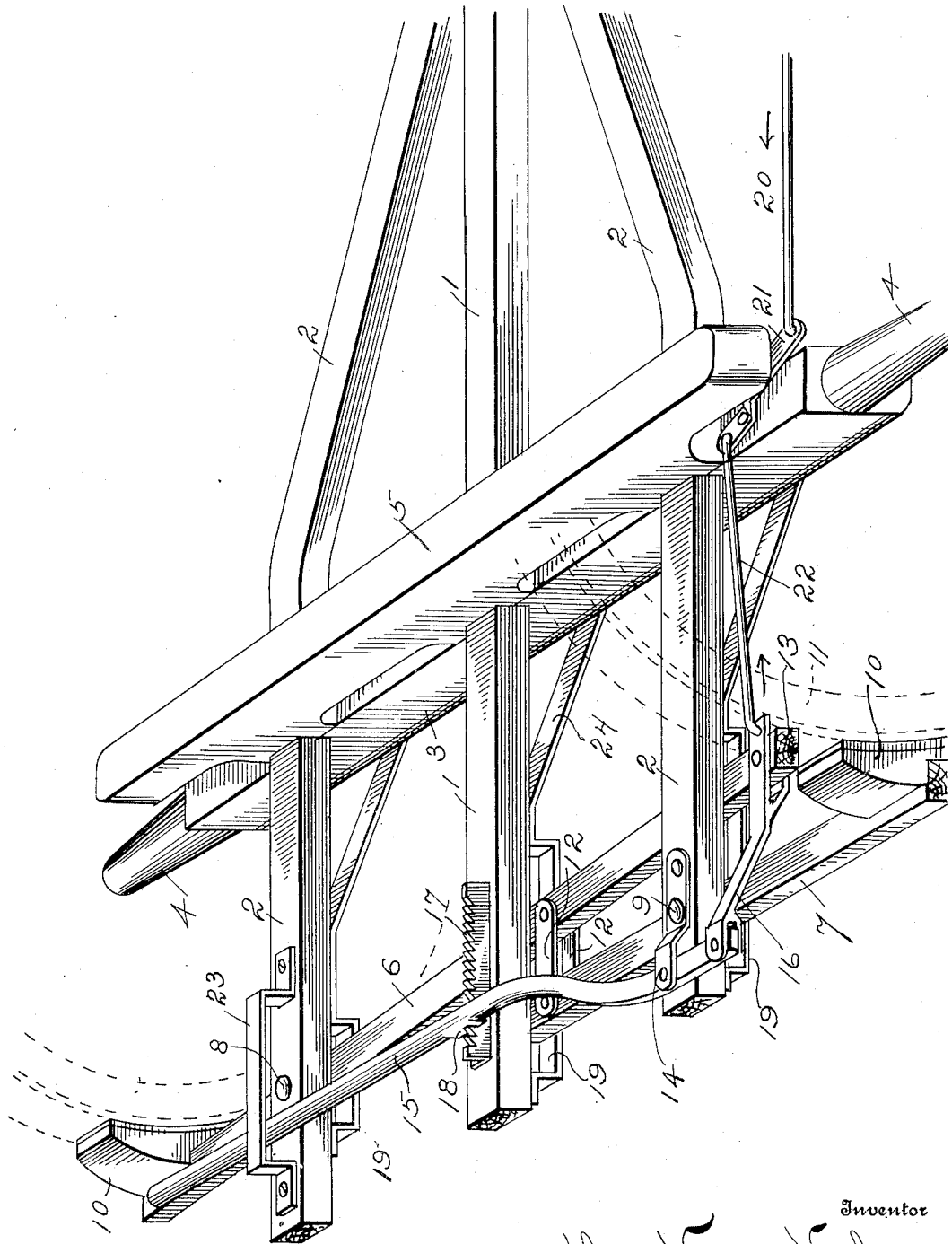

UNITED STATES PATENT OFFICE.

JOHN HENRY HUEHN, OF BELOIT, IOWA, ASSIGNOR TO CATHERINE KEENER, OF URBANA, OHIO.

WAGON-BRAKE.

No. 917,845.   Specification of Letters Patent.   Patented April 13, 1909.

Application filed November 21, 1908. Serial No. 463,783.

*To all whom it may concern:*

Be it known that I, JOHN HENRY HUEHN, a citizen of the United States, residing at Beloit, in the county of Lyon and State of Iowa, have invented certain new and useful Improvements in Wagon-Brakes, of which the following is a specification.

My invention relates to vehicles, and particularly to wagon brakes and the method of operating the same.

The object of the invention is to simplify the construction as well as the means and mode of operation of such device, whereby they will not only be cheapened but will be rendered more efficient in use, easily operated, more accessible, and unlikely to get out of repair.

A further object is to provide a construction in which the brake shoes will be pressed with considerable force against the rear sides of the carrying wheels, and further to provide means whereby the brake may be operated from either the forward portion or the rear of the vehicle.

With the above primary and other incidental objects in view as will more fully appear in the specification, the invention consists of the features of construction, the parts and combinations thereof, and mode of operation, or their equivalents, as hereinafter described and set forth in the claims.

The drawing is a perspective view of the rear portion of a wagon truck with the various parts of the brake construction in operative positions thereon.

Like parts are indicated by similar characters of reference.

Referring to the drawing, 1 is the reach; 2 are the hounds, on either side of the reach 1; 3 is the rear axle of the vehicle terminating at either end in the spindles 4; a bolster 5 is supported on the axle in the usual manner.

As thus far described, the construction is the ordinary construction to be found in vehicles for comparatively heavy work. Pivoted on the hounds 2 to the rear of the axle 3 and preferably to the under side of the hounds 2 are two transverse brake levers 6 and 7. The lever 6 is pivoted at 8 while the brake lever 7 is pivoted at 9 in such manner that the respective levers will oscillate in a horizontal plane. On the outer ends of the respective levers are carried brake shoes 10 which engage the rear side of the carrying wheels 11 indicated by dotted lines in the drawing. The brake levers 6 and 7 are connected substantially mid way between their respective pivotal connections by a link 12, whereby the respective brake levers will be caused to move in unison. The brake lever 6 is somewhat longer than the lever 7 and extends entirely across the wagon truck projecting beyond the opposite hound 2, as at 13. Pivoted in a suitable bracket 14 on the rear extremity of one of the hounds 2 is a transverse operating lever 15 adapted to oscillate in a horizontal plane. The lever 15 is connected by a link 16 with the projecting end 13 of the brake lever 6. An oscillatory movement of the operating lever 15 will cause a corresponding movement of the brake lever 6 through the connecting link 16, which will be transmitted through the link 12 to the brake lever 7.

Carried upon the upper side of the rear portion of the reach 1 is a rack or ratchet bar 17 engaged by a projecting tooth 18 on the operating lever 15 to retain the parts in their adjusted position. Attached to the under side of the hounds 2 and to the reach 1 are U shaped guards 19 which inclose and support the brake levers 6 and 7. These guards 19 serve as keepers for the levers limiting the movement thereof and support the projecting arms of the respective brake levers. By means of the operating lever 15 the brake shoes may be set or released from the rear of the vehicle. When it is desired to operate the brake mechanism from the front of the vehicle as would be the case when a wagon-bed was being used on the trucks, an additional operating lever is provided which may be of the ordinary well known construction, and located on the wagon-bed or on the truck adjacent to the forward end thereof. This second operating lever is not shown in the drawings, but is of the type usually found on vehicles of this character. This lever is connected by a connecting rod 20 with an auxiliary lever 21 pivoted to the axle 3 or to any other suitable portion of the wagon truck. The opposite arm of the pivoted auxiliary lever 21 is connected by a connecting rod 22 with the projecting end 13 of the brake lever 6. This enables the brake mechanism to be operated from the front of the vehicle by the operation of the second operating lever (not shown) as described above. The auxiliary lever 21 serves to reverse the movement of the parts, thus when the connecting rod 20 is caused to move as indicated by the arrow through the operation of the forward operating lever, the connecting rod 22 is reciprocated in the opposite direction as also indicated by the arrow to set the brake shoes 10 upon the periphery of the carrying wheels 11. It is to be understood that when the rear operating lever 15 is to be used the forward operating lever is disconnected, and vice-versa. A keeper or guard 23 is secured to the upper side of one of the hounds 2 and incloses the operating lever 15 and limits the movement thereof. At 24 are shown the usual braces between the reach, and hounds, and the axle.

From the above description it will be apparent that there is thus produced a brake mechanism of the character described, possessing the particular features of advantage before enumerated as desirable, and which obviously is susceptible of modification in its form, proportion, detail construction, and arrangement of parts.

Having thus described my invention I claim:

1. In a construction as described, a wagon truck, carrying wheels therefor, oppositely disposed brake levers pivoted on the under side of said truck and movable in a horizontal plane, U-shaped guards attached to the truck and inclosing and supporting the said brake levers, brake shoes carried on said levers and engaging the rear sides of the carrying wheels, an operating lever located at the rear of the truck, and a second operating lever located adjacent to the front of the truck, connections between each of the said operating levers, whereby the operation of either of said levers will oscillate the brake levers to move the brake shoes to and from engagement with the carrying wheels, substantially as specified.

2. In a construction as described, a wagon truck comprising a reach, hounds on either side thereof, and an axle, brake levers pivoted to the respective hounds extending parallel to each other and in opposite directions, said levers being movable in a horizontal plane, one of said levers extending entirely across the truck and projecting beyond the opposite hound, brake shoes carried on the outer ends of said levers, a link connecting said levers at the inner side of their pivotal points, an operating lever pivoted to one of the hounds and oscillating in a horizontal plane, a link connecting said lever with the projecting end of the extended brake lever, and a notched rack on the reach with which said operating lever engages to retain the parts in adjusted position, substantially as specified.

3. In a construction as described, a wagon truck, carrying wheels therefor, brake levers pivoted on said truck and oscillating in a horizontal plane, brake shoes carried on said lever and adapted to engage the rear side of the carrying wheels, a link connecting the brake levers whereby they will move in unison, an operating lever located adjacent to the front of the truck, a connecting rod extending rearward from said lever and engaging a pivoted auxiliary lever, a second connecting rod engaging said auxiliary lever on the opposite side of its pivotal point, and connecting therewith one of said brake levers whereby the motion imparted to said brake levers by the operation of said operating lever will be in reverse direction, substantially as specified.

In testimony whereof, I have hereunto set my hand this 28 day of October A. D. 1908.

JOHN HENRY HUEHN.

Witnesses:
H. N. COOPER,
S. B. RUENILL.